United States Patent Office 2,872,456

Patented Feb. 3, 1959

2,872,456

PROCESS FOR THE PRODUCTION OF CYCLIC AND NON-CYCLIC ESTERS

Donald M. Coyne and James C. Kirk, Ponca City, Okla., assignors to Continental Oil Company, Ponca City, Okla., a corporation of Delaware No Drawing. Application February 4, 1957
Serial No. 637,861

10 Claims. (Cl. 260—343)

This invention relates to the production of aliphatic esters and lactones and more particularly to an improved process for the production of such esters and lactones by the ozonolysis of ketones.

Processes have been purposed for the oxidation of ketones including those described in U. S. Patents Nos. 2,005,183 to W. Flemming et al. and 2,316,543 to W. J. Amend, whereby various ketones may be catalytically oxidized to acids. In these catalytic processes the ketone is subjected to oxidation in the liquid phase by means of a gas containing free oxygen such as pure oxygen, air, or oxygen enriched air. Flemming et al. disclose a large number of suitable catalysts while the patent to Amend is limited to metallo organic catalysts. In U. S. Patent No. 1,673,093 it is disclosed that lactones may be produced by heating carbo-cyclic ketones with monopersulfuric acid at a temperature within the range of 30 to 60° C. U. S. Patents Nos. 1,702,842 to 1,702,852 also disclose that lactones may be produced by similar processes. S. L. Friess, Journal of American Chemical Society, 71, 2571 (1949), describes a method whereby caprolactone may be produced by the reaction of perbenzoic acid with cyclohexanone. U. S. Patent No. 1,799,536, issued April 7, 1931, to Leopold Ruzicka describes a method for the preparation of large ring lactones from large ring ketones by treatment of the latter with persulfuric acid. Baeyer and Villiger, Berichte der deutschen Chemischen Gesellschaft disclose that Caro's acid (persulfuric acid) is specific in its reaction with cyclic ketones whereby the cyclic ketone is transformed to the corresponding lactone. W. von E. Doering and E. Dorfman, Journal of American Chemical Society, 75, 5595 (1953), describe a process whereby cyclic ketones are treated with perbenzoic acid in chloroform whereby the corresponding lactones are formed.

Although lactones may be prepared by the methods described above, certain disadvantages are inherent in those processes, as for example many of them require the use of perbenzoic acid or persulfuric acid. These acids are not only very corrosive but their use is coupled with considerable danger.

It is therefore a principle object of the present invention to provide a process which obviates these difficulties of the prior art processes. It is another object of our invention to provide a process whereby cyclic and non-cyclic aliphatic esters may be produced from ketones. These and other objects and advantages of the present process will be apparent as the invention is hereinafter more fully described.

To the accomplishment of the foregoing and related end this invention then comprises the features hereinafter fully described and particularly pointed out in the claims, the following description setting forth in detail certain illustrative embodiments of the invention, these being indicative, however, but of a few of the various ways in which the principles of the invention may be employed.

Broadly stated the present invention comprises a process whereby esters either non-cyclic or cyclic can be prepared from the corresponding non-cyclic or cyclic ketones by treatment of the ketone with ozone in the presence of a non-oxidizable hydrogen ion donor. When ozone is used, the use of per acids is avoided, and the corrosion and explosive problems associated with these per acids are avoided.

Before proceeding with specific examples illustrating our invention, it may be well to indicate in general the types of compounds required in the process.

Suitable ketones that may be used in our invention include cyclopentanone, methyl cyclopentanone, isopropyl cyclopentanone, cyclohexanone, methyl cyclohexanone, ethyl cyclohexanone, propyl cyclopentanone, cycloheptanone, and alkyl cycloheptanones. Non-cyclic aliphatic ketones that may be converted to esters include symmetrical dialkyl ketones which yield one ester such as diethyl ketone, dipropyl ketone, di-n-butyl ketone, and diamyl ketone. Non-symmetrical ketones are also operable in the process of our invention, however, mixtures of esters are usually obtained, such as for example, methyl propyl ketone, methyl isopropyl ketone, ethyl n-propyl ketone, ethyl butyl ketone, ethyl amyl ketone, and benzyl methyl ketone.

A non-oxidizable hydrogen ion donor that may be used in the present invention includes sulfuric acid of a concentration of from 94 to 100 percent, anhydrous boron trifluoride, hydrogen fluoride, or mixtures thereof.

The quantity of the hydrogen ion donor that may be used in the process of this invention may vary from about one to five moles per mole of ketone. Generally, however, we prefer to use about 1½ to about 2½ moles of the hydrogen donor per mole of ketone.

In some cases it may be preferable to carry out the reaction in the presence of an inert or oxidation resistant organic diluent such as carbon tetrachloride. Although the reaction may be carried out at super-atmospheric pressures, we prefer in general to employ atmospheric pressures wherein the temperature used may vary from about −5° C. to about 5° C. If desired, however, a wider temperature range may be used such as −25° C. to about 50° C.

In order to disclose the nature of the present invention still more clearly, the following illustrative examples will be given. It is to be understood that the invention is not to be limited to the specific conditions or details set forth in these examples, except so far as such limitations are specified in the appended claims. Parts used are parts by weight.

*Example 1*

Into a reactor was charged 20.0 parts of cyclohexanone in 800 parts of carbon tetrachloride. The mixture was cooled to 0° C. and 13.8 parts of boron trifluoride was passed in. Then to the cooled stirred mixture was added, during 7.5 hours, 8.82 parts of ozone. At the end of this time aqueous sodium carbonate was added until carbon dioxide evolution ceased. The carbon tetrachloride layer was separated and dried over anhydrous calcium sulfate. The mixture was then distilled. There was obtained 5.8 parts of cyclohexanone (boiling 70° C. at 41 mm. pressure; $n_D^{20}$ 1.4495) and 1.5 parts of caprolactone (boiling 100° C. at 7 mm.; $n_D^{20}$ 1.4632). The caprolactone was identified by heating with hydrazine hydrate whereby the hydrazide of 6-hydroxyhexanoic acid, M. P. 114–115° C., was obtained.

*Example 2*

Into a reactor was charged 800 parts of carbon tetrachloride and 40.0 parts of 96 percent sulfuric acid. The mixture was cooled to 0° C., and 20 parts of cyclohexanone added during 10 minutes. Then, while agitating and maintaining the temperature between 0 and 2° C. ozonized oxygen containing 42 mg. $O_3$ per liter was passed in for 8 hours whereby 9.5 parts of $O_3$ had been added. Aqueous sodium carbonate was added until carbon dioxide evolution ceased. The organic phase was worked up as in Example 1 whereby 2.5 parts of cyclohexanone were recovered and 1.5 parts of caprolactone were obtained.

*Example 3*

Example 1 was repeated with the exception that methyl n-amyl ketone was used in place of cyclohexanone. The organic phase was separated from the reaction mixture and extracted with aqueous sodium bisulfite. The extracted organic phase was then dried over sodium sulfate and distilled. There was obtained 13.5 parts of a product having a saponification number of 11 (probably a mixture of amyl acetate, methyl caproate, and unreacted ketone) boiling at 148 to 149° C.

While particular embodiments of the invention have been described it will be understood, of course, that the invention is not limited thereto, since many modifications may be made; and it is, therefore, contemplated to cover by the appended claims any such modifications as fall within the true spirit and scope of the invention.

The invention having thus been described what is claimed and described to be secured by Letters Patent is:

1. A process for the preparation of caprolactone by the ozonization of cyclohexanone which comprises passing an ozone containing gas through said cyclohexanone at a temperature within the range of −25 to 50° C. in the presence of a catalyst selected from the group consisting of boron trifluoride, hydrogen fluoride and sulfuric acid.

2. A process for the preparation of an ester by the ozonization of methyl n-amyl ketone which comprises passing an ozone containing gas through said methyl n-amyl ketone at a temperature within the range of −25 to 50° C. in the presence of a catalyst selected from the group consisting of boron trifluoride, hydrogen fluoride and sulfuric acid.

3. The process of claim 8 wherein the catalyst is sulfuric acid having a concentration within the range of 94 to 100 percent.

4. The process of claim 8 wherein the catalyst is boron trifluoride.

5. The process of claim 8 wherein the ozone containing gas is ozone.

6. The process of claim 8 wherein the ozone containing gas is ozonized oxygen.

7. The process of claim 8 wherein the amount of the non-oxidizable hydrogen ion donor varies from 1 to 5 moles per mole of ketone.

8. A process for the preparation of an ester selected from the group consisting of cyclic esters of the general formula:

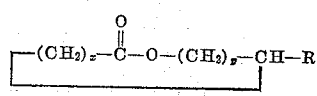

and non-cyclic esters of the general formula:

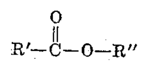

by the ozonization of a ketone selected from the group consisting of cyclic ketones of the general formula:

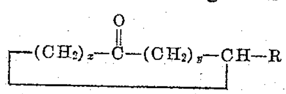

and non-cyclic ketones of the general formula:

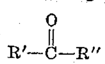

wherein R is selected from the group consisting of hydrogen and alkyl radicals containing from 1 to 3 carbon atoms, R′ and R″ are selected from the group consisting of alkyl radicals having from 1 to 7 carbon atoms and benzyl radicals, $x$ and $y$ may vary from 0 to 5, and the sum of $x$ and $y$ equals 4 to 6 which comprises passing an ozone containing gas through said ketone at a temperature within the range of −25 to 50° C. in the presence of a catalyst selected from the group consisting of boron trifluoride, hydrogen fluoride, and sulfuric acid.

9. A process for the preparation of an ester selected from the group consisting of cyclic esters of the general formula:

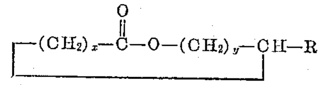

and non-cyclic esters of the general formula:

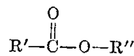

by the ozonization of a ketone selected from the group consisting of cyclic ketones of the general formula:

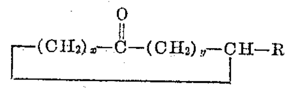

and non-cyclic ketones of the general formula:

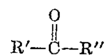

wherein R is selected from the group consisting of hydrogen and alkyl radicals containing from 1 to 3 carbon atoms, R′ and R″ are selected from the group consisting of alkyl radicals having from 1 to 7 carbon atoms and benzyl radicals, $x$ and $y$ may vary from 0 to 5, and the sum of $x$ and $y$ equals 4 to 6 which comprises passing an ozone containing gas through said ketone at a temperature within the range of −5 to 5° C. in the presence of a catalyst selected from the group consisting of boron trifluoride, hydrogen fluoride, and sulfuric acid.

10. A process for the preparation of an ester selected from the group consisting of cyclic esters of the general formula:

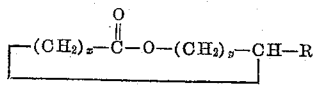

and non-cyclic esters of the general formula:

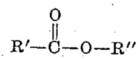

by the ozonization of a ketone selected from the group consisting of cyclic ketones of the general formula:

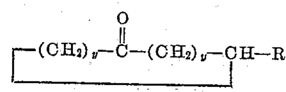

and non-cyclic ketones of the general formula:

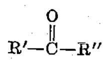

wherein R is selected from the group consisting of hydrogen and alkyl radicals containing from 1 to 3 carbon atoms, R′ and R″ are selected from the group consisting of alkyl radicals having from 1 to 7 carbon atoms and benzyl radicals, $x$ and $y$ may vary from 0 to 5, and the sum of $x$ and $y$ equals 4 to 6 which comprises passing an ozone containing gas through said ketone at a temperature within the range of −25 to 50° C. in the presence of an inert inorganic solvent and a catalyst selected from the group consisting of boron trifluoride, hydrogen fluoride, and sulfuric acid.

References Cited in the file of this patent

UNITED STATES PATENTS 2,267,377 Olin et al. ............ Dec. 23, 1941

OTHER REFERENCES

Leffler: Chem. Reviews, 45, pages 385–417 (1949).